United States Patent
Saito

(10) Patent No.: US 8,909,965 B2
(45) Date of Patent: Dec. 9, 2014

(54) CIRCUIT, ELECTRONIC DEVICE, AND IMAGE PROCESSING DEVICE

(75) Inventor: Takeshi Saito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 451 days.

(21) Appl. No.: 13/446,802

(22) Filed: Apr. 13, 2012

(65) Prior Publication Data

US 2012/0266004 A1    Oct. 18, 2012

(30) Foreign Application Priority Data

Apr. 14, 2011   (JP) ................. 2011-089828

(51) Int. Cl.
- *G06F 1/32* (2006.01)
- *G03G 15/00* (2006.01)
- *H04N 1/00* (2006.01)
- *H04N 1/23* (2006.01)
- *H04N 1/32* (2006.01)

(52) U.S. Cl.
CPC ............ *G06F 1/3284* (2013.01); *G06F 1/3287* (2013.01); *G06F 1/3293* (2013.01); *G03G 15/5004* (2013.01); *H04N 1/00896* (2013.01); *H04N 1/2307* (2013.01); *H04N 1/32587* (2013.01); *H04N 1/00891* (2013.01); *H04N 1/00904* (2013.01); *H04N 2201/0082* (2013.01); *Y02B 60/1267* (2013.01); *Y02B 60/32* (2013.01)
USPC ............................ 713/323; 713/320; 713/322

(58) Field of Classification Search
USPC ......................................... 713/320, 322, 323
See application file for complete search history.

(56) References Cited

U.S. PATENT DOCUMENTS

| | | | |
|---|---|---|---|
| 8,214,678 B2 * | 7/2012 | Abe ............................... | 713/324 |
| 2003/0025930 A1 * | 2/2003 | Tateyama ..................... | 358/1.14 |
| 2005/0283572 A1 | 12/2005 | Ishihara | |
| 2009/0125735 A1 * | 5/2009 | Zimmerman .................. | 713/310 |
| 2010/0007770 A1 | 1/2010 | Koganezawa et al. | |
| 2010/0218025 A1 | 8/2010 | Saito | |
| 2011/0058217 A1 | 3/2011 | Saito | |

FOREIGN PATENT DOCUMENTS

| | | |
|---|---|---|
| JP | 2006-004108 A | 1/2006 |
| JP | 2010-020387 A | 1/2010 |
| JP | 2010-194811 A | 9/2010 |
| JP | 2011-059937 A | 3/2011 |
| JP | 2011-224792 A | 11/2011 |

* cited by examiner

*Primary Examiner* — Thuan Du
(74) *Attorney, Agent, or Firm* — Maschoff Brennan

(57) ABSTRACT

An SoC is connected to an SDRAM that is controlled by a memory controller and a memory PHY, and the SoC is operable in a normal mode and in a power saving mode. The SoC includes a block A to be powered off in the power saving mode and a block B not to be powered off in the power saving mode. A memory controller is included in the block A. A memory PHY and signal level holding cells are included in the block B. The signal level holding cells are provided between the memory controller and the memory PHY, and are configured to fix output signals from the memory controller at predetermined levels in the power saving mode.

6 Claims, 8 Drawing Sheets

FIG. 3

LIST OF ELEMENT CONFIGURATIONS FOR SOC

|  | BLOCK A (POWERED OFF IN POWER SAVING MODE) | BLOCK B (NORMALLY POWERED ON) |
|---|---|---|
| EXISTING CONFIGURATION |  | MAIN CPU<br>GROUP OF PROCESSING CIRCUITS<br>MEMORY CONTROLLER<br>MEMORY PHY |
| CONFIGURATION A | MAIN CPU<br>GROUP OF PROCESSING CIRCUITS | MEMORY CONTROLLER<br>MEMORY PHY |
| CONFIGURATION B (THIS EMBODIMENT) | MAIN CPU<br>GROUP OF PROCESSING CIRCUITS<br>MEMORY CONTROLLER | MEMORY PHY |
| CONFIGURATION C | MAIN CPU<br>GROUP OF PROCESSING CIRCUITS<br>MEMORY CONTROLLER<br>MEMORY PHY |  |

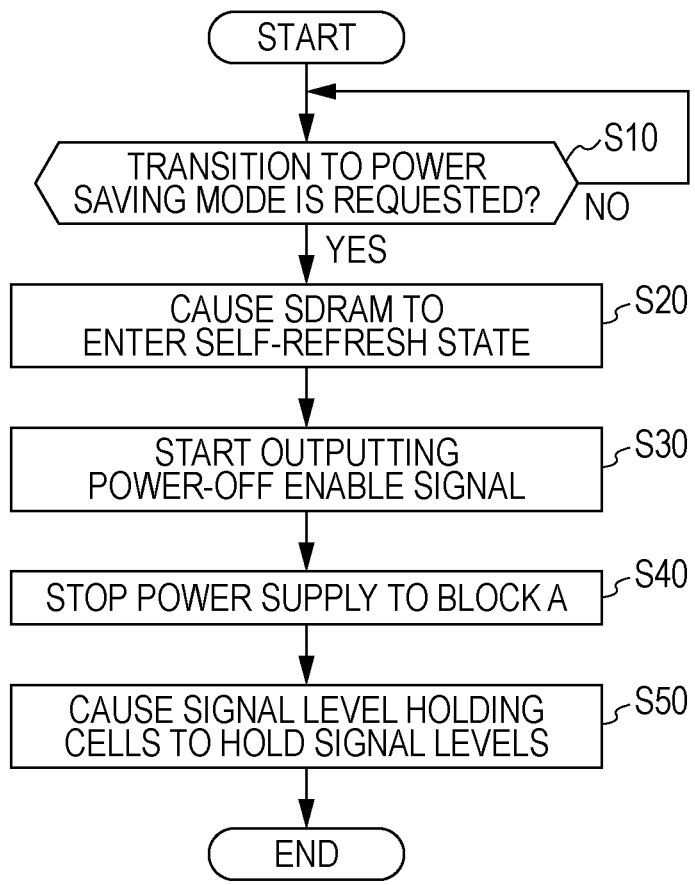

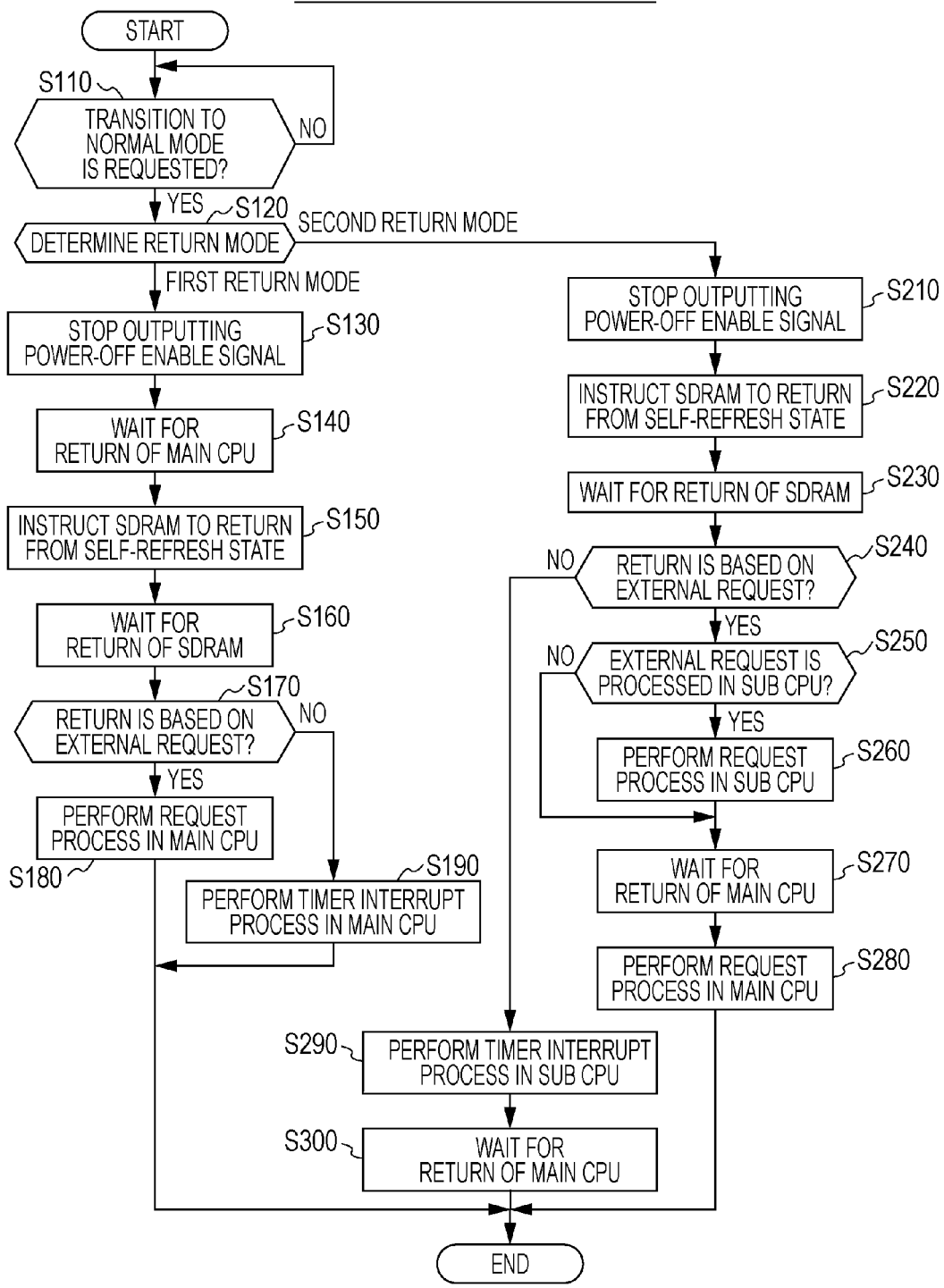

CIRCUIT, ELECTRONIC DEVICE, AND IMAGE PROCESSING DEVICE

BACKGROUND

1. Technical Field

The present invention relates to a circuit, an electronic device, and an image processing device, and particularly to power-saving control.

2. Related Art

In recent years, there has been a demand for electronic devices including image processing devices such as printers that operate with reduced power consumption. For example, there is an electronic device having a normal mode in which the electronic device operates normally and a power-saving mode in which some operations are stopped. The following example is an example of a known power-saving operation. A plurality of devices (e.g., central processing unit: CPU, random-access memory: RAM, read-only memory: ROM, and various types of processing circuits) provided in the main elements, such as a system on chip (SoC), an application specific integrated circuit (ASIC), and a large scale integration (LSI) chip, of an electronic device are divided into a plurality of blocks, and then some of the blocks are powered off.

JP-A-2006-4108 discloses a method that provides a power-controlled block and stops and starts power supply to the block.

The circuit size and the power saving capability of an electronic device vary depending on how the aforementioned various devices are arranged in a block where power supply is turned off in the power saving mode and in a block where power supply is turned on in the power saving mode.

SUMMARY

An advantage of some aspects of the invention is that it provides a method of enabling an electronic device to operate with reduced power consumption.

According to an aspect of the invention, a circuit that is connected to an external memory controlled by a memory controller and a memory PHY, and is operable in a normal mode and in a power saving mode, includes a first block to be powered off in the power saving mode and a second block not to be powered off in the power saving mode. The first block has included therein the memory controller. The second block has included therein the memory PHY, and a signal level holding unit provided between the memory controller and the memory PHY. The signal level holding unit is configured to fix an output signal from the memory controller at a predetermined level in the power saving mode.

Here, the first block may have included therein a mediation circuit configured to mediate a request to the controller.

The first block may have included therein a first CPU configured to send a request to the memory controller, and a plurality of processing circuits configured to perform predetermined processing.

The second block may have included therein a second CPU, and a command converter configured to receive a request of the second CPU and issue a command to the external memory. In the second block, the second CPU monitors generation of an external request or an internal request in the power saving mode, and starts processing of return to the normal mode if the external request or the internal request is generated.

An electronic device may include the aforementioned circuit.

A printing apparatus may include the aforementioned circuit.

BRIEF DESCRIPTION OF THE DRAWINGS

The invention will be described with reference to the accompanying drawings, wherein like numbers reference like elements.

FIG. 3 is a list of element configurations in an SoC.

FIG. 7 is a flowchart illustrating a process of transition to a power saving mode according to one example of the embodiment of the invention.

FIG. 8 is a flowchart illustrating a process of transition (return from the power saving mode) to a normal mode according to one example of the embodiment of the invention.

DESCRIPTION OF EXEMPLARY EMBODIMENT

One example of an embodiment of the invention will be described below with reference to the accompanying drawings.

In this embodiment, a description will be given of a printer, which is an image processing device, taken as an example of an electronic device. The electronic device is, of course, not limited to a printer, and may be an image processing device such as a multifunction printer, a copier, or a scanner. The electronic device is also not limited to an image processing apparatus, and electronic devices of other types may be employed.

Figure 1:
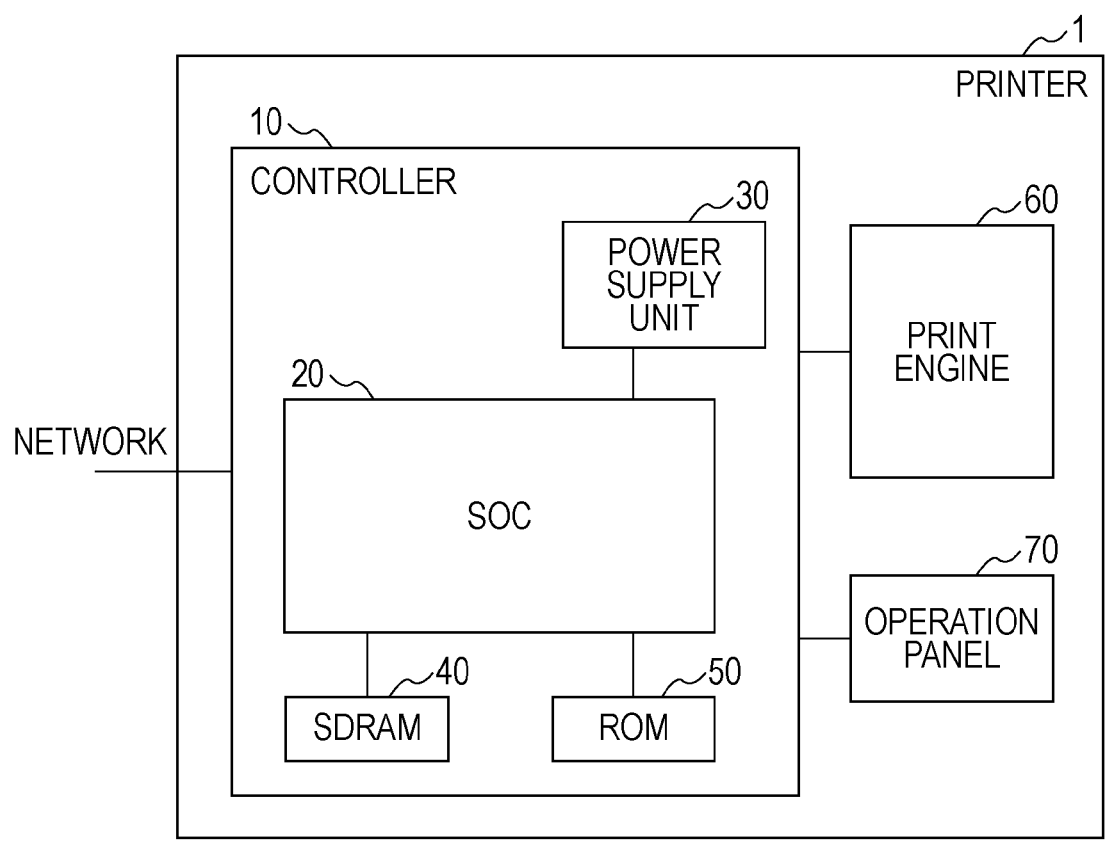
FIG. 1 is a block diagram illustrating a schematic configuration of a printer according to one example of an embodiment of the invention.

FIG. 1 is a block diagram illustrating a schematic configuration of the printer according to one example of an embodiment of the invention.

A printer 1 is a device that receives print data and prints on a print medium on the basis of the print data. The printer 1 is a laser page printer, for example. The printer 1 may, of course, be an ink jet printer or a serial printer.

The printer 1 includes a controller 10 that integrally controls the printer 1, a print engine 60 that prints on a print medium, and an operation panel 70 that displays various kinds of information and accepts input performed by a user's operation.

The controller 10 includes an SoC 20 that is a circuit that controls an SDRAM 40 to perform processing using various programs, a power supply unit 30 that supplies power to the SoC 20, a synchronous DRAM (SDRAM) 40 that volatilely stores various programs and data, and a ROM 50, such as a flash ROM, which non-volatilely stores various programs and data.

In this embodiment, the SDRAM 40 is a double data rate (DDR)-SDRAM, for example. The SDRAM 40 has a self-refresh function. The SDRAM 40 operates at high speeds, and therefore access control to the SDRAM 40 is performed by a memory controller, a memory physical interface (PHY) separate from the memory controller, and a stub series termination logic (SSTL) I/O, as described below.

The print engine 60 is a unit that prints on a print medium on the basis of print data under control of the controller 10. The print engine 60 is an engine of a laser type that includes a toner cartridge, a photosensitive drum, a laser-beam irradiation mechanism, a transfer mechanism, a paper feed mechanism, a paper-feeding-and-discharging mechanism, and so on, for example. Of course, the print engine 60 is not limited to a laser type, but may be an inkjet type.

The operation panel 70 is an input-output (I/O) interface between the printer 1 and a user. The operation panel 70, for example, includes a display, such as a liquid crystal display or an organic electro-luminescence display, and a touch panel, a hard switch, and the like functioning as input devices.

Note that, the configuration of the printer 1 has been described above as the major configuration for describing the characteristics of the invention in this application, and the configuration is not limited to that described above. The above configuration is not intended to exclude other configurations that typical printers have. For example, the SoC 20 may be composed of one or more ASICs.

Figure 2:
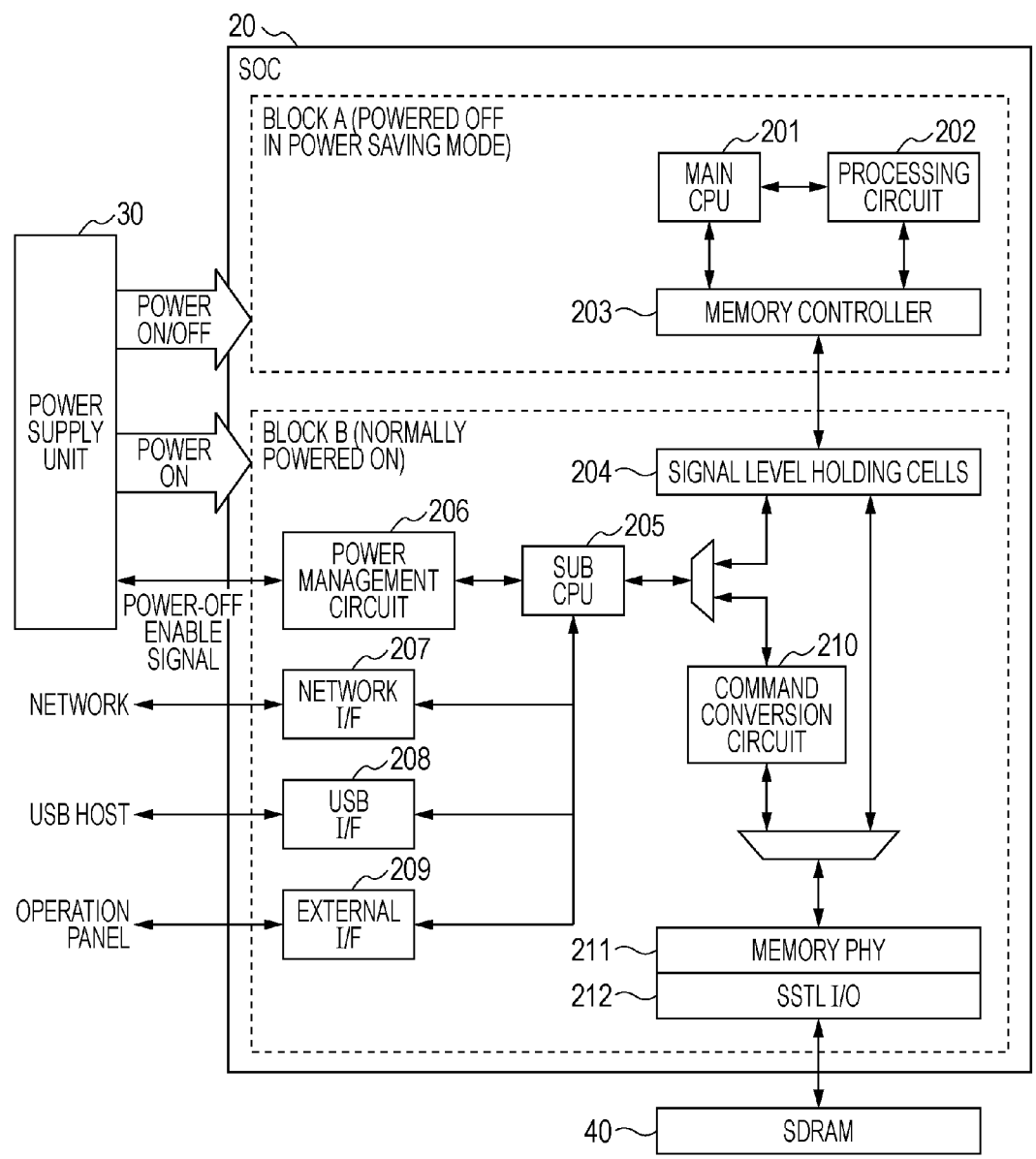
FIG. 2 is a block diagram illustrating a schematic configuration of an SoC according to one example of the embodiment of the invention.

FIG. 2 is a block diagram illustrating a schematic configuration of an SoC according to one example of the embodiment of the invention.

The SoC 20 includes a main CPU 201, processing circuits 202, a memory controller 203, signal level holding cells 204, a sub CPU 205, a power management circuit 206, a network interface (I/F) 207, a universal serial bus (USB) I/F 208, an external I/F 209, a command conversion circuit 210, a memory PHY 211, and an SSTL I/O 212.

In this embodiment, the SoC 20 has a block A that is powered off in the power saving mode, and a block B that is normally powered on. Devices of the SoC 20 are disposed separately in the block A and in the block B. The main CPU 201, the processing circuits 202, and the memory controller 203 are included in the block A. The signal level holding cells 204, the sub CPU 205, the power management circuit 206, the network I/F 207, the USB I/F 208, the external I/F 209, the command conversion circuit 210, the memory PHY 211, and the SSTL I/O 212 are included in the block B.

The power supply unit 30 supplies power to the block A and stops the power supply in accordance with signals output from the power management circuit 206. That is, power supply to the block A is stopped while a power-off enable signal is input, and power is supplied to the block A when the power-off enable signal is stopped. The power supply unit 30 always supplies power to the block B both in a normal mode and in the power-saving mode.

The main CPU 201 is an arithmetic unit that runs a predetermined program to implement the main functions of the printer 1. The main CPU 201 basically operates when the printer 1 is in the normal mode. The main CPU 201 can access the SDRAM 40 via the memory controller 203.

The main CPU 201 monitors whether transition to the power saving mode is requested, when the printer 1 is in the normal mode. If transition to the power saving mode is requested, the sub CPU 205 is notified of this fact.

The processing circuit 202 is a circuit that performs predetermined processing. A plurality of processing circuits 202 are provided although a single processing circuit 202 is illustrated in this figure. The processing circuit 202 is a circuit that performs various kinds of image processing and data processing, for example. The processing circuit 202 can access the SDRAM 40 via the memory controller 203.

The sub CPU 205 is an arithmetic unit that runs a predetermined program to implement the functions regarding the power saving mode of the printer 1. Basically, the sub CPU 205 operates both when the printer 1 is in the normal mode and when the printer 1 is in the power saving mode. The sub CPU 205 can access the SDRAM 40 via the command conversion circuit 210. The sub CPU 205 may access the SDRAM 40 via the memory controller 203.

When the main CPU 201 notifies the sub CPU 205 of a request for transition to the power saving mode, the sub CPU 205 starts transition processing. For example, the sub CPU 205 instructs the power management circuit 206 to output a power-off enable signal to the power supply unit 30.

The sub CPU 205 monitors a request from an external source to the printer 1 or a request from an internal source to the printer 1 while the printer 1 is in the power saving mode, and starts return processing if a request is issued. For example, the sub CPU 205 instructs the power management circuit 206 to stop outputting of a power-off enable signal to the power supply unit 30.

The memory controller 203 accepts a request from the master of the main CPU 201, the processing circuits 202, and the like, and issues a command to the SDRAM 40. The memory controller 203 outputs the generated command and the like to the memory PHY 211 via the signal level holding cells 204.

The memory PHY 211 performs physical layer control of the SDRAM 40. The memory PHY 211 performs, for example, phase control, timing control, and the like of a signal output from the memory controller 203 or the command conversion circuit 210, and outputs the signal to the SDRAM 40.

The SSTL I/O 212 is an interface circuit connected with the memory PHY 211 and the SDRAM 40, for transmitting a signal at a high speed and at a low signal amplitude to the SDRAM 40.

The command conversion circuit 210 accepts a request coming from the sub CPU 205, bypassing the memory controller 203, and issues a command to the SDRAM 40. The command conversion circuit 210 outputs the generated command and the like to the memory PHY 211. Note that the command conversion circuit 210 needs only to issue a command required for processing to be performed by the sub CPU 205, and therefore at least some functions that the memory controller 203 has are implemented.

The power management circuit 206 is a circuit that outputs a signal to the power supply unit 30. The power management circuit 206 starts or stops outputting of a power-off enable signal to the power supply unit 30 in accordance with an instruction of the sub CPU 205.

The network I/F 207 is an interface circuit that is connected to a network, such as a local area network (LAN), and controls transmission and reception of data. The USB I/F 208 is an interface circuit that is connected to a USB host and controls transmission and reception of data through a USB. The external I/F 209 is an interface circuit that controls transmission and reception of data with devices such as the ROM 50 and the operation panel 70. These circuits notify the sub CPU 205 upon receipt of a request from the outside.

The signal level holding cells 204 fix all signals output from the block A at their respective predetermined levels (high or low) during the power saving mode (when the block A is powered off). In this embodiment, a plurality of output signals from the memory controller 203 are fixed at their respective predetermined levels, so that various devices in the block B are prevented from malfunctioning, for example, so that the SDRAM 40 can be maintained in a self-refresh state.

Various input and output signals are fixed at their respective predetermined levels so as to prevent current from flowing from the block B to the block A or from the block A to the block B. Note that the signal level holding cells 204 allow various input and output signals to pass therethrough in the normal mode.

Although not illustrated, a mediation circuit that mediates requests from the main CPU 201 and the processing circuits 202 to the memory controller 203 may be provided in the block A of the SoC 20.

Note that, the configuration of the SoC 20 has been described above as the major configuration for describing the characteristics of the invention in this application, and the configuration is not limited to that described above. The above configuration is not intended to exclude other configurations that typical SoCs have. For example, the SoC 20 may include an ASIC having one or more devices.

With reference to FIG. 3 to FIG. 6, the characteristics of an SoC according to one example of this embodiment will next be described more clearly.

FIG. 3 is a list of configurations of elements in an SoC. As illustrated in the figure, as configurations of elements in an SoC, an existing configuration and configurations A to C, for example, are conceivable. Note that here a main CPU, a group of processing circuits, a memory controller, and a memory PHY are mentioned as examples of the main components.

In the existing configuration, a main CPU, a group of processing circuits, a memory controller, and a memory PHY are disposed in the block B. In the configuration A, a main CPU and a group of processing circuits are disposed in the block A, and a memory controller and a memory PHY are disposed in the block B. In the configuration B (this embodiment), a main CPU, a group of processing circuits, and a memory controller are disposed in the block A, and a memory PHY is disposed in the block B (with reference to FIG. 2). In the configuration C, a group of processing circuits, a memory controller, and a memory PHY are disposed in the block A.

Figure 4:
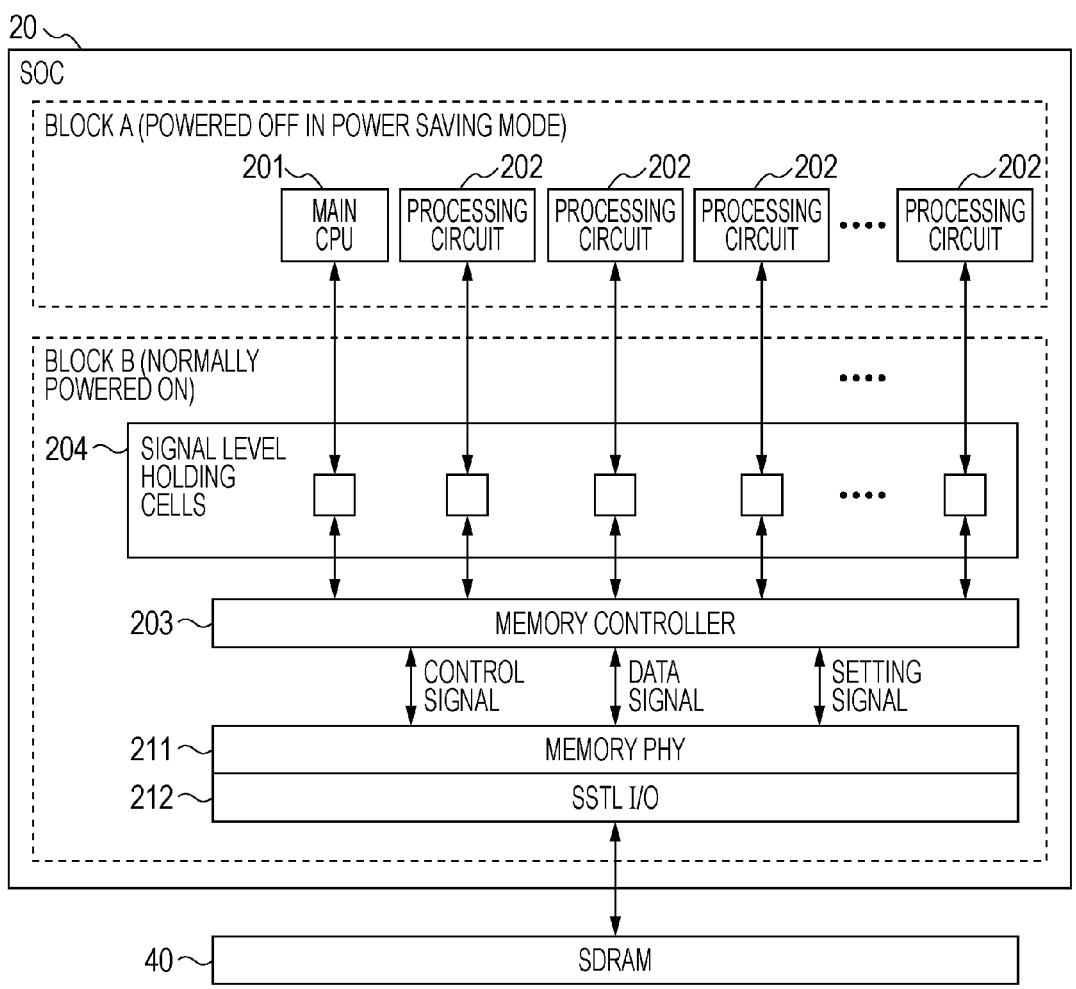
FIG. 4 is a block diagram illustrating an SoC (configuration A) that does not have characteristics of the embodiment of the invention.

In detail, the configuration A is as illustrated in FIG. 4, for example. That is, the signal level holding cells 204 are provided between the main CPU 201 and a plurality of processing circuits 202 included in the block A and the memory controller 203 included in the block B. The signal level holding cells 204 have cells that correspond to output signals from the main CPU 201 and the plurality of processing circuits 202. For example, the output signals are fixed at their respective predetermined levels so that the SDRAM 40 can be maintained in the self-refresh state during the power saving mode. As the total number of the main CPU 201 and the plurality of processing circuits 202 increases, the number of cells increases.

Accordingly, in the configuration A, the signal level holding cells 204 need to be provided between the memory controller 203, and the main CPU 201 and the processing circuits 202. Compared with the configurations B and C, the circuit size is large in the configuration A. Since the main CPU 201 and the processing circuits 202 are disposed in the block A, the memory controller 203 has high power saving capability compared with the existing configuration. However, the power saving capability of the memory controller 203 is inferior to that of each of the configuration B and the configuration C.

Note that a mediation circuit that mediates requests from the main CPU 201 and the processing circuits 202 to the memory controller 203 may be provided between the signal level holding cells 204 and the memory controller 203.

Figure 5:
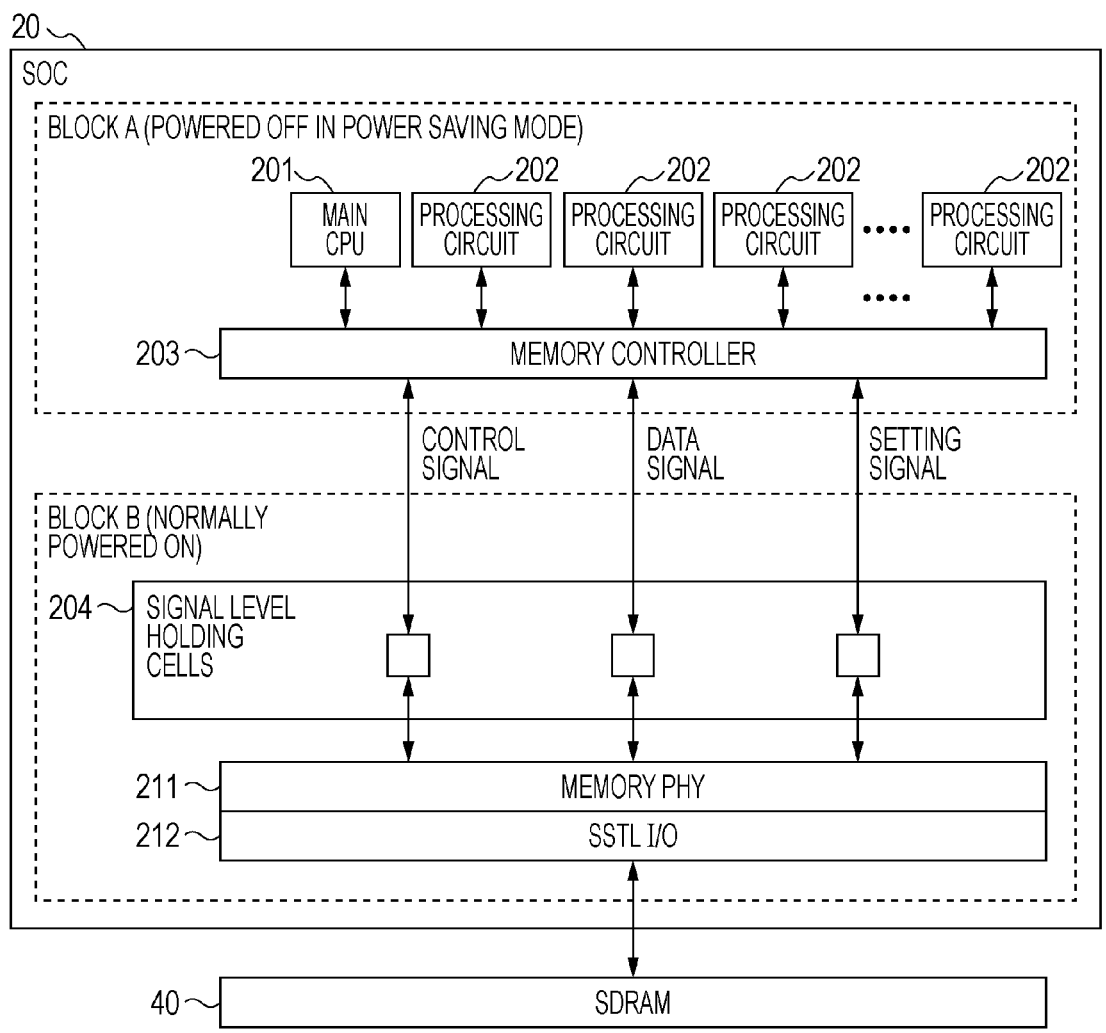
FIG. 5 is a block diagram illustrating an SoC (configuration B) according to the embodiment of the invention.

In detail, the configuration B (this embodiment) is as illustrated in FIG. 5, for example. That is, the signal level holding cells 204 are provided between the memory controller 203 included in the block A and the memory PHY 211 included in the block B. The signal level holding cells 204 have cells that correspond to output signals (e.g., a control signal, a data signal, and a setting signal) from the memory controller 203. For example, the output signals are fixed at their respective predetermined levels so that the SDRAM 40 can be maintained in the self-refresh state during the power saving mode.

Fewer signals than those transmitted between the memory controller 203, and the main CPU 201 and the plurality of processing circuits 202, are transmitted between the memory controller 203 and the memory PHY 211. Even if the total number of the main CPU 201 and the plurality of processing circuits 202 increases, the number of signals transmitted between the memory controller 203 and the memory PHY 211 does not change, and therefore the number of cells does not change.

In the configuration B, accordingly, regardless of the number of output signals of the main CPU 201 and the processing circuits 202, the signal level holding cells 204 may be provided in accordance with the number of output signals from the memory controller 203 that is smaller than that number of output signals of the main CPU 201 and the processing circuits 202. The circuit size of the configuration B is therefore smaller than that of the configuration A. Since the memory controller 203 is disposed in the block A, the configuration B has high power saving capability compared with the existing configuration and the configuration A.

In the configuration B, the memory PHY 211 is disposed in the block B, and therefore is operable during the power saving mode, and is always operable, even immediately after return from the power saving mode to the normal mode. The memory PHY 211 can control the SDRAM 40 via the command conversion circuit 210 from the sub CPU 205 (with reference to FIG. 2), and therefore can cause the SDRAM 40 to return from the self-refresh state to a normal access state before return from the power saving mode to the normal mode (even when the main CPU 201 stops).

Note that a mediation circuit that mediates requests from the main CPU 201 and the processing circuits 202 to the memory controller 203 may be provided between the memory controller 203, and the main CPU 201 and the processing circuits 202. As is apparent also from the viewpoint that the mediation circuit belongs to the block A, the configuration B has high power saving capability compared with the existing configuration and the configuration A.

Figure 6:
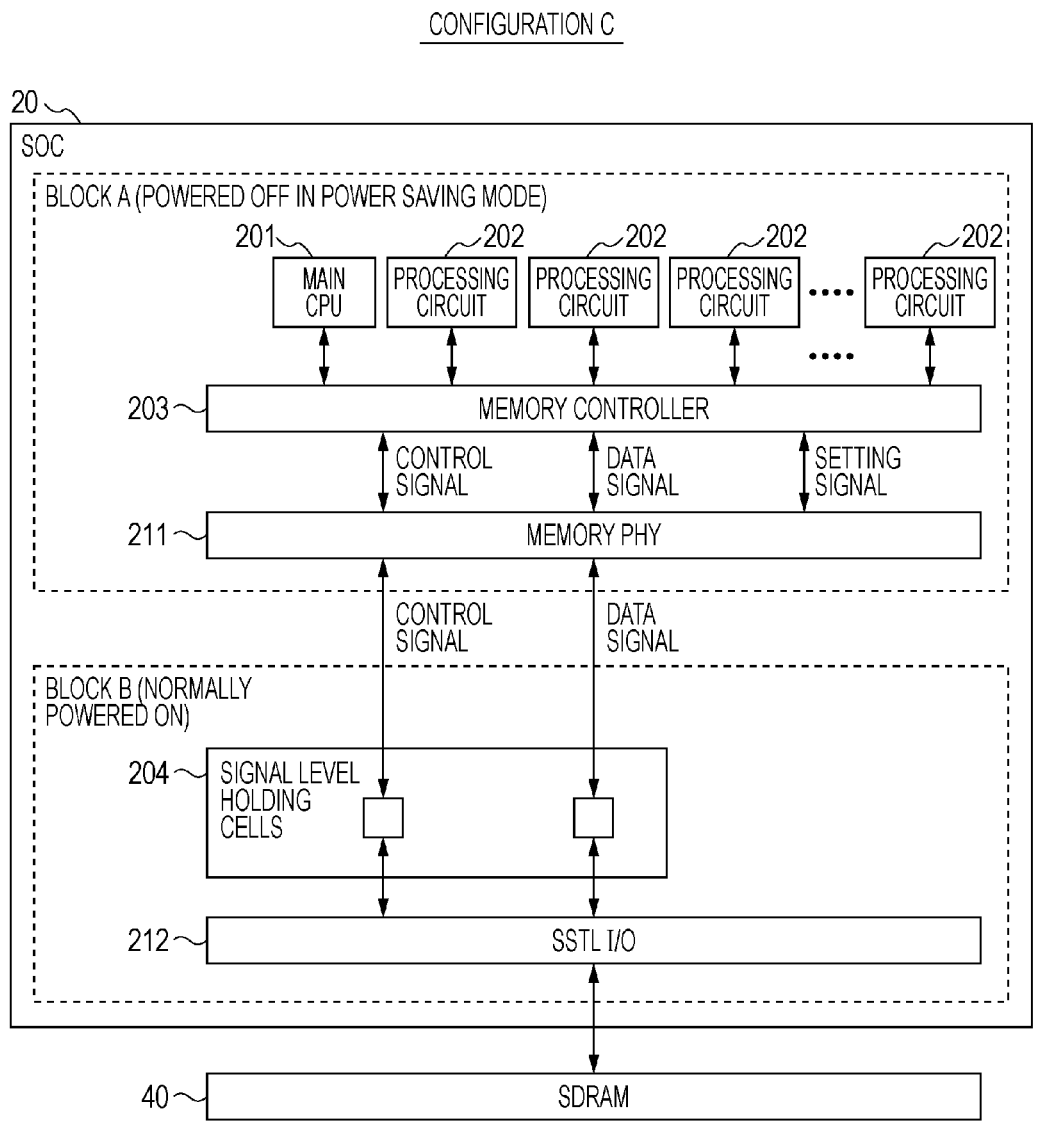
FIG. 6 is a block diagram illustrating an SoC (configuration C) that does not have characteristics of the embodiment of the invention.

In detail, the configuration C is as illustrated in FIG. 6, for example. That is, the signal level holding cells 204 are provided between the memory PHY 211 included in the block A and the SSTL I/O 212 included in the block B. The signal level holding cells 204 have cells that correspond to output signals (e.g., a control signal and a data signal) from the memory PHY 211. For example, the output signals are fixed at their respective predetermined levels so that the SDRAM 40 can be maintained in the self-refresh state during the power saving mode.

Fewer signals than those transmitted between the memory controller 203 and the memory PHY 211 are transmitted between the memory PHY 211 and the SSTL I/O 212. Even if the total number of the main CPU 201 and the plurality of processing circuits 202 increases, the number of signals transmitted between the memory PHY 211 and the SSTL I/O 212 does not change, and therefore the number of cells does not change.

In the configuration C, accordingly, regardless of the number of output signals of the main CPU 201 and the processing circuits 202, the signal level holding cells 204 may be provided in accordance with the number of output signals from the memory PHY 211 that is smaller than that number of output signals of the main CPU 201 and the processing circuits 202. The circuit size of the configuration C is therefore smaller than that of each of the configuration A and the configuration B. Since the memory controller 203 and the memory PHY 211 are disposed in the block A, the configuration C has high power saving capability compared with the existing configuration and the configuration A.

Unfortunately, in the configuration C, the memory PHY 211 is powered off in the power saving mode. For this reason, before return from the power saving mode to the normal mode, the SDRAM 40 cannot be returned from the self-refresh state to the normal access state. This causes the return from the self-refresh state to the normal access state to be later than that in the case of the configuration A or the configuration B. The memory PHY 211 is disposed at a distance from the SSTL I/O 212. This requires circuitry or the like for stabilizing analog signals, leading to increases in cost. The signal level holding cells 204 are disposed near the SSTL I/O 212, and therefore the frequency of a signal would be less likely to increase. This results in low performance compared with the configuration A and the configuration B.

Note that a mediation circuit that mediates requests from the main CPU 201 and the processing circuits 202 to the memory controller 203 may be provided between the memory controller 203, and the main CPU 201 and the processing circuits 202.

From the foregoing description, the configuration B is selected in this embodiment.

Characteristic operations of the SoC according to one example of this embodiment will next be described.

FIG. 7 is a flowchart illustrating a process of transition to the power saving mode according to one example of the embodiment of the invention. This flow starts while the printer 1 operates in the normal mode, for example.

In S10, a request for transition to the power saving mode is monitored. In detail, the main CPU 201 monitors whether the transition to the power saving mode is requested. In the case where a predetermined time has passed without input of a request from any of the network I/F 207, the USB I/F 208, and the external I/F 209, for example, the main CPU 201 can determine that transition to the power saving mode should be performed. In the case where a user's operation to provide an instruction for transition to the power saving mode is made via the operation panel 70, for example, the main CPU 201 can determine that transition to the power saving mode should be performed. If transition to the power saving mode is requested (S10: YES), then the main CPU 201 notifies the sub CPU 205, and the process moves to S20. If transition to the power saving mode is not requested (S10: NO), then monitoring is continued.

In S20, the SDRAM 40 enters the self-refresh state. In detail, the main CPU 201 (or the sub CPU 205) instructs the memory controller 203 to issue a predetermined command, so that the SDRAM 40 enters the self-refresh state. Then, the process proceeds to S30. Note that the main CPU 201, the processing circuits 202, and the memory controller 203 disposed in the block A may perform preparation processing for powering off, such as storing the state of a program in the SDRAM 40.

In S30, outputting of a power-off enable signal is started. In detail, upon receiving a notification from the main CPU 201, the sub CPU 205 instructs the power management circuit 206 to output a power-off enable signal to the power supply unit 30. Then, the process proceeds to S40.

In S40, power supply to the block A is stopped. In detail, upon receiving input of the power-off enable signal, the power supply unit 30 stops power supply to the block A. Then, the process proceeds to S50.

In S50, the levels of various signals are held by the signal level holding cells 204. In detail, a plurality of output signals from the memory controller 203 are fixed at their respective predetermined levels so that various devices in the block B are prevented from malfunctioning, for example, so that the SDRAM 40 can be maintained in the self-refresh state. Various input and output signals are fixed at their respective predetermined levels so as to prevent current from flowing from the block B to the block A or from the block A to the block B. Thus, this flow ends.

In such a manner as described above, transition from the normal mode to the power saving mode is performed.

FIG. 8 is a flowchart illustrating a process of transition (return from power saving mode) to the normal mode according to one example of the embodiment of the invention. This flow starts while the printer 1 operates in the power saving mode, for example.

In S110, a request for transition to the normal mode is monitored. In detail, the sub CPU 205 monitors whether transition to the normal mode is requested. In the case where an external request is input from any of the network I/F 207, the USB I/F 208, and the external I/F 209, for example, the sub CPU 205 can determine that transition to the normal mode should be performed. In the case where an internal request such as an interrupt generated by a timer (not included in the block A), for example, the sub CPU 205 can determine that transition to the normal mode should be performed. If transition to the normal mode is requested (S110: YES), then the process moves to S120. If transition to the normal mode is not requested (S110: NO), then monitoring is continued.

In S120, a return mode is determined. In detail, the sub CPU 205 determines the return mode. In this embodiment, a first return mode in which return processing is basically performed by the main CPU 201 and a second return mode in which return processing is basically performed by the sub CPU 205 are provided. As for the return mode, one of the modes is set beforehand as the default configuration in the ROM 50 or the like, for example. The return mode may, of course, be set such that a user is allowed to change its settings from a host personal computer (PC) via the network I/F 207, or from the operation panel 70 via the external I/F 209, for example. If the return mode is the first return mode (S120: first return mode), then the process moves to S130. If the return mode is the second return mode (S120: the second return mode), then the process moves to S210.

In S130, outputting of a power-off enable signal is stopped. In detail, the sub CPU 205 instructs the power management circuit 206 to finish outputting of a power-off enable signal to the power supply unit 30. Thus, power supply to the block A is started. Then, the process proceeds to S140.

In S140, return of the main CPU 201 from a power-off state to a normal operation state is waited for. Note that the processing circuits 202 and the memory controller 203 disposed in the block A return to the normal operation state. After the return, the process proceeds to S150.

In S150, the SDRAM 40 is instructed to return from the self-refresh state. In detail, the main CPU 201 instructs the memory controller 203 to issue a predetermined command for causing the SDRAM 40 to transition from the self-refresh state to the normal access state. Then, the process proceeds to S160.

In S160, return from the self-refresh state of the SDRAM 40 is waited for. In detail, the SDRAM 40 enters the normal access state in response to input of a signal corresponding to the predetermined command for causing the SDRAM 40 to enter the normal access state. After the return, the process proceeds to S170.

In S170, it is determined whether the return is based on an external request. In detail, the main CPU 201 determines that the return is based on an external request in the case where the external request is provided in S110 (S170: YES), and the process moves to S180. In the case where an internal request, such as a timer interrupt, is provided in S110, it is determined that the return is not based on an external request (S170: NO), and this flow ends. Note that, in S110, the sub CPU 205 may hold the contents of a request, and so on in the ROM 50, the internal RAM, and the like.

In S180, a request is processed by the main CPU 201. In detail, the main CPU 201 performs a process in response to the request accepted in S110. Thus, this flow ends. Note that, the main CPU 201 performs pre-processing, such as receipt of a request, in S180, and performs the main processing in response to the request after the end of this flow (after the process of transition to the normal mode is completed), for example. An external request is print data received via the network I/F 207, for example, and the main processing in response to the external request is printing based on print data, for example.

In S190, a timer interrupt process is performed by the main CPU 201. In detail, the main CPU 201 performs processing corresponding to the timer interrupt that has occurred in S110. Thus, this flow ends. Note that the main CPU 201 performs pre-processing, such as canceling an action of a timer, in S190, and performs the main processing in response to the timer interrupt after the end of this flow (after the process of transition to the normal mode is completed), for example. The main processing in response to the timer interrupt is calibration processing of the print engine 60, for example.

Processing in S210 is the same as in S130. In S220, the SDRAM 40 is instructed to return from the self-refresh state. In detail, the sub CPU 205 instructs the command conversion circuit 210 to issue a predetermined command for causing the SDRAM 40 to transition from the self-refresh state to the normal access state. Then, the process proceeds to S230.

Processing in S230 is the same as in S160. In S240, it is determined whether the return is based on an external request. In detail, the sub CPU 205 determines that the return is based on an external request in the case where the external request is provided in S110 (S240: YES), and the process moves to S250. In the case where an internal request, such as a timer interrupt, is provided in S110, it is determined that the return is not based on an external request (S240: NO), and the process moves to S290.

In S250, it is determined whether the external request is to be processed by the sub CPU 205. In detail, the sub CPU 205 determines on the basis of the contents of the request and a predetermined standard, for example, whether the sub CPU 205 can process at least part of the processing in response to the external request. The predetermined standard can be a standard in which information representing whether processing that cannot be performed by the sub CPU 205 is included or not is associated with each of the contents of the request. Of course, such a method of determination is illustrative, and other determination methods may be employed. If the sub CPU 205 can perform at least part of processing in response to the external request (S250: YES), then the process moves to S260. If the sub CPU 205 cannot process the external request (S250: NO), then the process moves to S270.

In S260, the request is processed by the sub CPU 205. In detail, the sub CPU 205 performs processing in response to the request accepted in S110. However, regarding the processing in response to the request, at least part thereof that is practical is performed by the sub CPU 205. For example, in S260, the sub CPU 205 performs practical processing in pre-processing in response to the request. Processing that is not practical here is to be performed by the main CPU 201 in S280. Then, the process proceeds to S270.

Processing in S270 is the same as in S140. In S280, the request is processed by the main CPU 201. In detail, the main CPU 201 performs all the pre-processing in response to the external request, or the pre-processing that has not been performed by the sub CPU 205 in S260. If, in S260, the sub CPU 205 has performed all the pre-processing in response to the request, then the main CPU 201 need not perform processing. Thus, this flow ends. Note that the main processing in response to the request is performed by the main CPU 201 after the end of this flow (after the process of transition to the normal mode is completed).

In S290, the timer interrupt processing is performed by the sub CPU 205. In detail, the sub CPU 205 performs processing in response to the timer interrupt that has occurred in S110. Thus, this flow ends. Note that, in S290, the sub CPU 205 performs pre-processing, such as canceling an action of a timer, for example. The main processing in response to the timer interrupt is performed by the main CPU 201 after the end of this flow (after the process of transition to the normal mode is completed).

Processing in S300 is the same as in S140.

In such a manner as described above, transition from the power saving mode to the normal mode is performed. In the second return mode, before the main CPU 201 returns, return of the SDRAM, at least part of processing in response to a request, and other processing are performed by the sub CPU 205. This allows processing to proceed before the main CPU 201 returns, thereby shortening a time for return to the normal mode. Since the return of the SDRAM is performed by the sub CPU 205, the main CPU 201 can use that SDRAM immediately after the main CPU 201 returns.

Note that the first return mode may be prevented from being performed (that is, processing in S110, and S210 to S300 is performed).

Processing units described above with reference to FIG. 7 and FIG. 8 are determined by dividing processing of the printer 1 in accordance with the main processing contents for ease of understanding. The method of division in the invention in this application is not limited to division into processing units or names of processing units. Processing of the printer 1 may also be divided into more processing units in accordance with the processing contents. Processing of the printer 1 may also be divided in such a manner that one processing unit has an increased amount of processing.

One example of the embodiment of the invention has been described above. According to this embodiment, an electronic device can operate with less power consumption. Moreover, an electronic device can operate with reduced power consumption while the circuit size thereof can be reduced to a minimum. Moreover, return processing is performed by the sub CPU. This enables return from the power saving mode to the normal mode to be speeded up.

The foregoing embodiment of the invention is intended to be illustrative, not restrictive, of the spirit and scope of the invention. It will be apparent to those skilled in the art that alternatives, modifications, and variations may be made.

The entire disclosure of Japanese Patent Application No. 2011-089828, filed Apr. 14, 2011 is expressly incorporated by reference herein.

What is claimed is:

1. A circuit connected to an external memory, the external memory being controlled by a memory controller and a memory PHY, the circuit being operable in a normal mode and in a power saving mode, the circuit comprising:
    a first block to be powered off in the power saving mode, and a second block not to be powered off in the power saving mode;
    the first block having included therein
        the memory controller
    the second block having included therein
        the memory PHY, and
        a signal level holding unit provided between the memory controller and the memory PHY, the signal level holding unit being configured to fix an output signal from the memory controller at a predetermined level in the power saving mode.

2. The circuit according to claim 1, wherein the first block has included therein a mediation circuit configured to mediate a request to the controller.

3. The circuit according to claim 1, wherein the first block has included therein
    a first CPU configured to send a request to the memory controller, and
    a plurality of processing circuits configured to perform predetermined processing.

4. The circuit according to claim 3,
wherein the second block has included therein
    a second CPU, and
    a command converter configured to receive a request of the second CPU and issue a command to the external memory, and
wherein the second CPU monitors generation of an external request or an internal request in the power saving mode, and starts processing of return to the normal mode if the external request or the internal request is generated.

5. An electronic device comprising the circuit according to claim 1.

6. A printing apparatus comprising the circuit according to claim 1.

* * * * *